Feb. 24, 1942.　　E. LIVESEY ET AL　　2,273,875
DRAG PAN
Filed July 30, 1940　　2 Sheets-Sheet 1

Inventor
Edward Livesey
Palmer Copeland
By Clarence A. O'Brien
Attorney

Feb. 24, 1942.                E. LIVESEY ET AL                2,273,875
                                  DRAG PAN
                            Filed July 30, 1940            2 Sheets-Sheet 2

Inventor
Edward Livesey
Palmer Copeland

By *Clarence A. O'Brien*

Attorney

Patented Feb. 24, 1942

2,273,875

UNITED STATES PATENT OFFICE 2,273,875

DRAG PAN

Edward Livesey, Raleigh, and Palmer Copeland, Apex, N. C.

Application July 30, 1940, Serial No. 348,472

2 Claims. (Cl. 37—126)

This invention appertains to new and useful improvements in drag pans and more particularly to drag pans especially adapted for use in conjunction with 1940 model Ford tractors.

The principal object of the present invention is to provide a drag pan adapted for use in conjunction with tractors having hydraulic lift means, to the end that the pan can be readily controlled by a single man.

Another important object of the invention is to provide a drag pan adapted for use in conjunction with tractors equipped with hydraulic lift means wherein the drag pan is constructed in such a manner as to permit operation thereof in a convenient and substantially effortless manner by the operator of the tractor.

Other objects and advantages of the invention will become apparent to the reader of the following specification.

Figure 1:
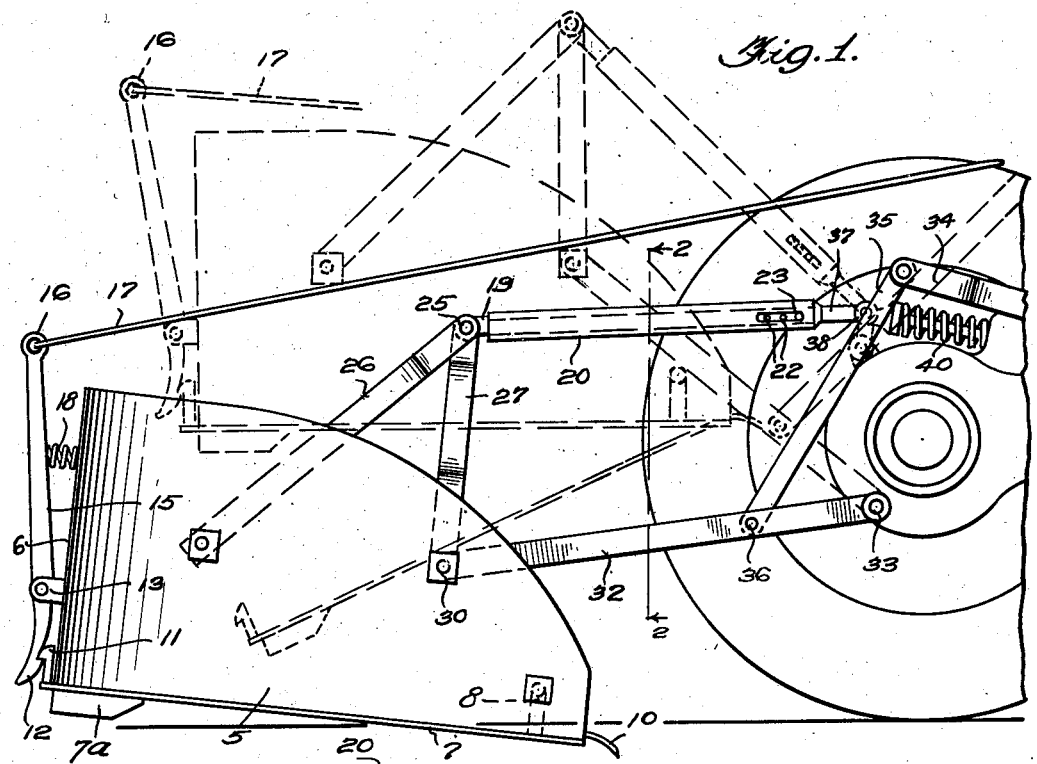
Figure 1 represents a side elevational view of the drag pan shown connected to a tractor.
Figure 2:
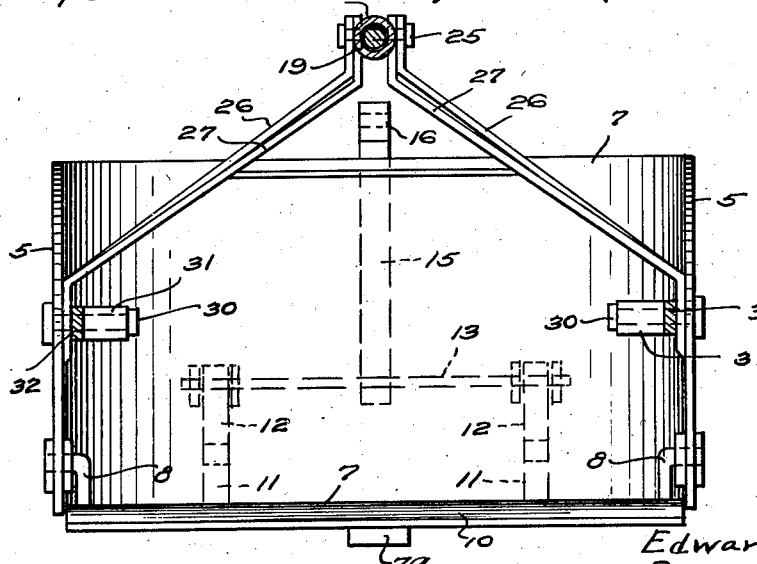
Figure 2 is a sectional view taken substantially on the line 2—2 of Figure 1.

Referring to the drawings wherein like numerals designate like parts, it can be seen that the pan consists of side walls 5—5 connected by a back wall 6. Numeral 7 denotes a releasable bottom, the same having trunnions 8 disposed into sockets 9 at the forward inner sides of the side walls 5. The forward edge portion of the bottom 7 is provided with a curved cutter blade 10, while the other end of the bottom 7 is provided with a pair of headed keepers 11 with which the bevel headed latch members 12 fixed to a shaft 13 are engageable to hold the bottom 7 in elevated position. The shaft 13 is disposed through bearings 14 on the outside of the rear wall 6, and an arm 15 rises from the shaft 13 and has an eye 16 at its upper end through which can be slid a control rope or the like 17. A coiled compression spring 18 is interposed between the wall 6 and the arm 15, maintaining the arm with the catch members 13 engaged with the keepers 11.

As shown in Figure 1, numeral 19 denotes an elongated rod disposed longitudinally in a sleeve 20, this sleeve being formed with a slot 21 to expose openings 22 in the rod 19. A pin 23 can be disposed into any one of these openings 22 depending upon the length of the rod and sleeve 20 desired. This connection 19, 20 permits adequate adjustment and sufficient play to withstand sudden shock. Further, this connection 19, 20 permits the rearward tilting of the bowl as soon as the blade is raised far enough to be out of contact with the ground. The rear end of the rod 19 has a head 24 and this has a pin 25 extending therethrough and also through offset end portions of the link bars 26—26 and 27—27. The link bars 26 are connected by a bridge member 28 and they are pivotally secured as at 29 to the inner side of the walls 5. The side walls 5—5 are provided with inwardly disposed studs 30 which pass through the lower ends of the links 27 and on these studs 30 are collars 31 from which the arms 32 extend. These arms 32 are pivotally secured to the tractor as at 33.

Numeral 34 denotes a conventional hydraulic lift member such as is found on 1940 model Ford tractors which has link members 35 extending therefrom to pivotally connect to intermediate portions of the arms 32 as at 36.

Figure 3:
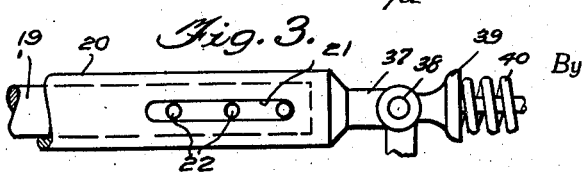
Figure 3 is a fragmentary side elevational view of the coupling.
Figure 4:
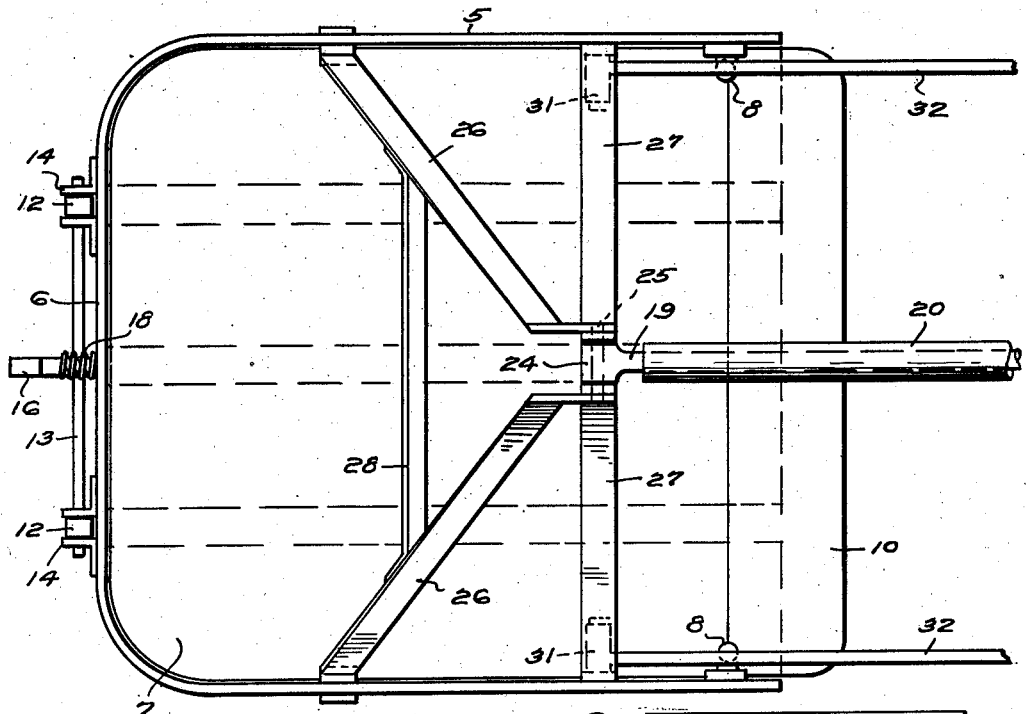
Figure 4 is a fragmentary top plan view.
Figure 5:
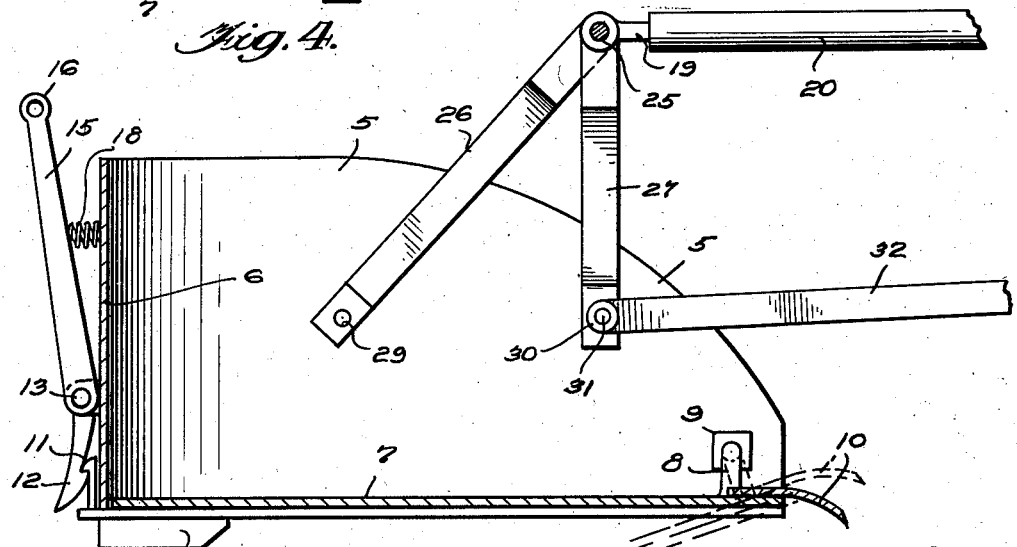
Figure 5 is a longitudinal fragmentary sectional view through the pan.

As shown in Figures 1 and 3, the sleeve 20 has an extension 37 fulcrumed as at 38 on the head 39 of the conventional master control spring 40 such as is found on 1940 model Ford tractors and devised to measure reaction of forces applied to compression links by soil engaging parts of the implement.

It can now be seen that by operation of the hydraulically controlled member 34, the pan can be elevated with a load therein and the tractor pan moved to a point where the contents of the pan is to be deposited. By simply pulling on the line 17 the bottom can be released.

A heel 7a is provided at the free end of the bottom which in striking the ground facilitates closing the bottom.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a tractor having a power lift, a drag pan provided with a releasable bottom opening in a rearward direction, a blade at the forward edge of the pan, thrust arms pivotally connected to side portions of the pan forwardly of the center of gravity thereof, a slidable connection between the upper ends of the thrust arms and the tractor, a pair of pivotal links having their forward ends pivotally connected to the tractor and their rearward ends pivotally connected to the pan at the side portions thereof and at points where the thrust arms connect to the pan, and a link member extending from the power lift to the said pivotal link members, and brace members extending from the upper portions of the thrust arms to the rearward portion of the pan.

2. In combination with a tractor having a power lift, a drag pan provided with a releasable bottom opening in a rearward direction, a blade at the forward edge of the pan, thrust arms pivotally connected to side portions of the pan forwardly of the center of gravity thereof, a slidable connection between the upper ends of the thrust arms and the tractor, a pair of pivotal links having their forward ends pivotally connected to the tractor and their rearward ends pivotally connected to the pan at the side portions thereof and at points where the thrust arms connect to the pan, and a link member extending from the power lift to the said pivotal link members, and brace members extending from the upper portions of the thrust arms to the rearward portion of the pan, and a shoe depending from the rearward portion of the releasable bottom to cause tilting of the pan and biting of the blade into the earth when the pan is lowered.

EDWARD LIVESEY.
PALMER COPELAND.